US012775165B2

(12) United States Patent
Stephenson

(10) Patent No.: US 12,775,165 B2
(45) Date of Patent: Oct. 27, 2026

(54) WIDE-FIELD HEAD-UP DISPLAY (HUD) EYEGLASSES

(71) Applicant: Robert S Stephenson, Oakland, CA (US)

(72) Inventor: Robert S Stephenson, Oakland, CA (US)

( * ) Notice: Subject to any disclaimer, the term of this patent is extended or adjusted under 35 U.S.C. 154(b) by 0 days.

(21) Appl. No.: 13/958,584

(22) Filed: Aug. 4, 2013

(65) Prior Publication Data

US 2015/0036221 A1 Feb. 5, 2015

(51) Int. Cl.
*G02B 27/01* (2006.01)
*G02B 26/10* (2006.01)

(52) U.S. Cl.
CPC ......... *G02B 27/0101* (2013.01); *G02B 26/10* (2013.01); *G02B 27/0172* (2013.01); *G02B 2027/011* (2013.01); *G02B 2027/0123* (2013.01); *G02B 2027/0127* (2013.01); *G02B 2027/0174* (2013.01)

(58) Field of Classification Search
CPC .............................. G02B 27/017; G02B 27/01
USPC .................................................. 359/630, 631
See application file for complete search history.

(56) References Cited

U.S. PATENT DOCUMENTS

| | | | | | |
|---|---|---|---|---|---|
| 5,343,313 | A * | 8/1994 | Fergason | G02B 27/017 | 349/87 |
| 7,158,096 | B1 * | 1/2007 | Spitzer | G02B 27/0172 | 359/13 |
| 2010/0289723 | A1 * | 11/2010 | London | G02B 27/08 | 353/1 |
| 2012/0169752 | A1 * | 7/2012 | Kurozuka | G02B 26/101 | 345/545 |
| 2013/0021373 | A1 * | 1/2013 | Vaught | G06F 3/013 | 345/633 |
| 2013/0222214 | A1 * | 8/2013 | Takeda | G02B 27/0172 | 345/8 |
| 2014/0313121 | A1 * | 10/2014 | Lee | G02C 11/04 | 351/158 |

* cited by examiner

*Primary Examiner* — James C. Jones

(57) ABSTRACT

The present invention introduces a compact, HUD eyeglass display system of novel design that makes it possible to superimpose a wide-angle, computer-generated view on the real-world view, without obscuring the wearer's vision or requiring any additional optical element such as beam-splitters or contact lenses. The digital display is visible regardless of which way the wearer turns his eyes, and has great depth of field, so both it and the external scene appear in focus, regardless of the distance to the scene. These head-up display eyeglasses are compatible with prescription lenses.

15 Claims, 7 Drawing Sheets

WIDE-FIELD HEAD-UP DISPLAY (HUD) EYEGLASSES

This patent application claims the benefit of priority of provisional patent application 61/742,623, filed Aug. 15, 2012.

BACKGROUND

Head-up displays (HUDs) are used to present computer-generated data on top of a view of the real world. The HUD in a fighter aircraft, for example, superimposes instrument readings on the pilot's view out of the canopy. In larger displays this has typically been achieved by combining the real world view and the computer display view with a half-silvered mirror. HUD eyeglasses, a miniature and portable version of this, are used for augmented reality games, factory automation and aircraft maintenance, to give just a few examples. Head-up eyeglasses present a difficulty, however, because they sit close to the face and do not allow room for such a half-silvered mirror. In general, they have been implemented in prior art by placing a small display screen or other image source in front of one or both eyes, generally slightly above or to one side of the eye, or by using a small array of partially mirrored narrow strips. In either case they partially or completely obstruct the wearer's view of the world through one eye and present only a limited field of vision. Alternatively they require special contact lenses in addition to special eyeglasses.

True head-up eyeglasses that don't require such obstructed vision, provide full-screen computer displays to both eyes and resemble ordinary eyeglasses have long been a subject of science fiction. Their realization would not only enable the applications mentioned above, but would revolutionize mobile computing in general. As personal computing moves from the desktop or laptop to the mobile device, there is acute need for a portable, widescreen, high-resolution display much larger than could fit in a pocket. HUD eyeglasses as described in this invention provide the most versatile solution to answer this need.

There are many difficulties to developing wide-field HUD eyeglasses, which explains why viable implementations have not been described until now. The first, of course, is finding a compact and effective ocular relay, the optical element in a HUD that receives light from a projector off to one side and redirects it so that it can enter the pupil of the eye and be seen.

Then, to be commercially successful, such HUD eyeglasses must be comfortable as well as stylish. Besides being lightweight, they must be adapted to the functional characteristics of the human eye which set it apart from other optical instruments, namely:

1. frequent, rapid changes in accommodation to view objects at different distances will induce eyestrain.
2. the eye moves in its socket (up to 150 degrees horizontally and 120 degrees vertically) as we examine a scene, jumping rapidly from point to point.
3. the head may move as well
4. visual acuity is high only in the center of the retina, and falls off from the center of gaze sharply (e.g. 50% in 3 degrees)

What we call "seeing," then, includes two distinct phenomena:

i. detailed vision, where the gaze jumps from point to point as the eye moves in its socket to examine a scene, and
ii. peripheral vision, where surrounding objects are perceived—more or less indistinctly—while the gaze remains fixed.

Taken together, points 1 and 2 imply two seemingly contradictory design requirements for HUD eyeglasses:

I. the image of the widescreen, digital display should always be in focus with the scene behind it—i.e should have a depth-of-field from, e.g., 1 foot to infinity (corresponding to a near-zero numerical aperture)
II. the light should converge on the eye from a near-hemispherical solid angle Vitale et al. (U.S. Pat. No. 7,952,059 B2) proposed to address point 2 by using an ellipsoidal mirror as the ocular relay in a HUD. The requirement that light should converge on the eye regardless of which direction the eye is pointed is well satisfied by an ellipsoidal mirror. It has been well known to mathematicians since Euclid that a prolate ellipsoid (a cigar-shaped, 3-dimensional figure formed by rotating an ellipse about its long axis) has two focal points on its long axis such that waves of light (or sound) arising from one focus, when reflected from the inner surface of the ellipsoid, will converge at the other (see FIG. 1). If the center of rotation of the eye is located at one focus of such an ellipsoidal mirror and a source of light is placed at the other, then some rays arising from the light will always be directed straight into the eye regardless of which way it turns in its socket.

An ellipsoid, however, is too bulbous a shape to make a successful eyeglass lens, and has optical aberrations that pose serious challenges.

Powell et al. (U.S. Pat. No. 7,656,585 B1), on the other hand, explicitly discuss a Fresnel lens or mirror (they refer to both as a "lens") and pay lip service to holographic and diffraction lenses, but never mention the notions of ellipsoidal conjugate foci or the importance of eye movements in vision.

This invention is a HUD eyeglass system that circumvents most of these difficulties, and resolves the contradiction mentioned previously as well.

In the specification and claims that follow:

the term "scene" refers to the view of the outside world that a wearer of normal eyeglasses (or none at all) would enjoy, the term "image" refers to visual data presented to the eye, without regard whether it arises from the natural scene or the HUD's digital display; or whether that image is composed of text, graphics, video or photos the term "digital display" refers to the computer-generated image superimposed by the HUD eyeglasses on the view of the scene, regardless whether it is sequentially presented by a raster-scanning laser or simultaneously presented by a LED panel.

the term "ocular relay" refers to the optical element in a HUD that receives light from a projector outside the eye's gaze and redirects it so that it can enter the pupil of the eye and be seen.

These abbreviations are used throughout the text:

HUD: Head-Up Display
HOE: Holographic Optical Element
LED: Light Emitting Diode

SUMMARY

It is therefore an object of the present invention to provide a HUD eyeglass system that consists of:

an image projector at the side of the face with a very small exit pupil (i.e. that is almost a point source), and an eyeglass lens that also serves as an ocular relay, redirecting the light rays from the projector towards the center of the wearer's eye. The lens also allows light through it like ordinary glasses.

In this way, whichever direction the user looks, the wearer will see the digitally generated image superimposed on the external scene, and in focus with it regardless of how near or far the external object of interest may be.

BRIEF DESCRIPTION OF THE DRAWINGS

It should be understood that, in some figures, details may have been enlarged for clarity rather than drawn to scale. Similar numerals denote similar items throughout the drawings.

DETAILED DESCRIPTION

Requirement I (in Background, above) that the digital display should be in focus with the scene behind it means that the former should have great depth of field (or equivalently, near-zero numerical aperture). This is well satisfied by a projector with a very small exit pupil. In other words, the projector needs to appear to be nearly a point source.

Figure 1:
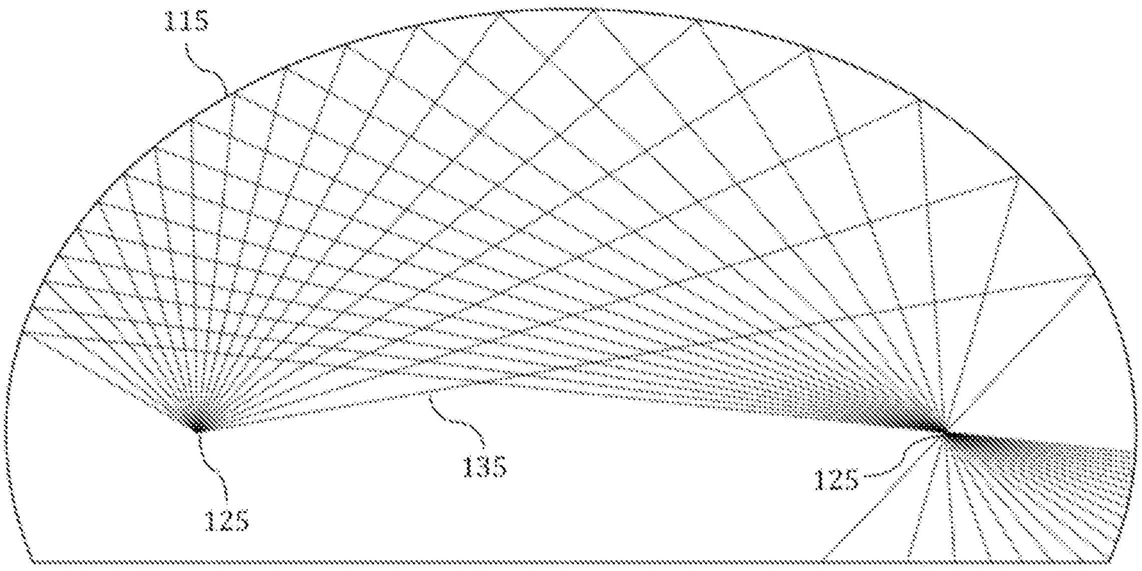
FIG. 1 is a cross section through a prolate ellipsoidal mirror, showing how light rays arising from one of the two foci are reflected to the other.

As mentioned in Background, using an ellipsoidal mirror as an ocular relay solves the directional problem, because light from a source at one focus is reflected by the mirror so as to pass through the other focus (located at the center of the eye). FIG. 1 shows a cross section through the major axis of a prolate ellipsoidal shell 115. Rays of light 135, originating at the left-hand focus 125, reflect off the wall 115 and pass through the other focus 125. This is true also for a HOE, a Fresnel mirror or a Fresnel lens as long as they each have a pair of conjugate foci. In addition, other mirror shapes (e.g. double parabola, spheroid) are possible.

Unfortunately, the imaging properties of ellipsoidal mirrors and their HOE or Fresnel analogues are poor for sources that are not located exactly at a focus. They exhibit spherical aberration, astigmatism (this is easy to understand in the case of an ellipsoid, since the radii of curvature of the surface are generally not equal) and distortion. The spherical aberration and astigmatism will affect a light source of any finite extent centered at a focus. They may be reduced to an acceptable level by a combination of a) adding a corrective lens to the projector, and b) shrinking the exit pupil of the projector until it becomes nearly a point source. The field distortion, on the other hand, is present for a source of any size, and is evident in FIG. 1. Note that the rays emanating from the left-hand focus are regularly spaced every 7.5 degrees, but the converging rays at the right-hand focus are not regularly spaced. Correcting this is discussed below.

In reducing aberrations, how small can the exit pupil be? One criterion is that the zero-order diffraction image of the projector's exit pupil (the zero-order pattern is the smallest image feature the projector can generate) not exceed a certain angular size. For example 1 minute of arc is equivalent to the resolution Apple's retina display held at arms length. This would correspond to a projector exit pupil of about 1.7 mm. Note that the actual resolution from such a projector will vary across the visual field due to changes in magnification, as just discussed.

Figure 2:
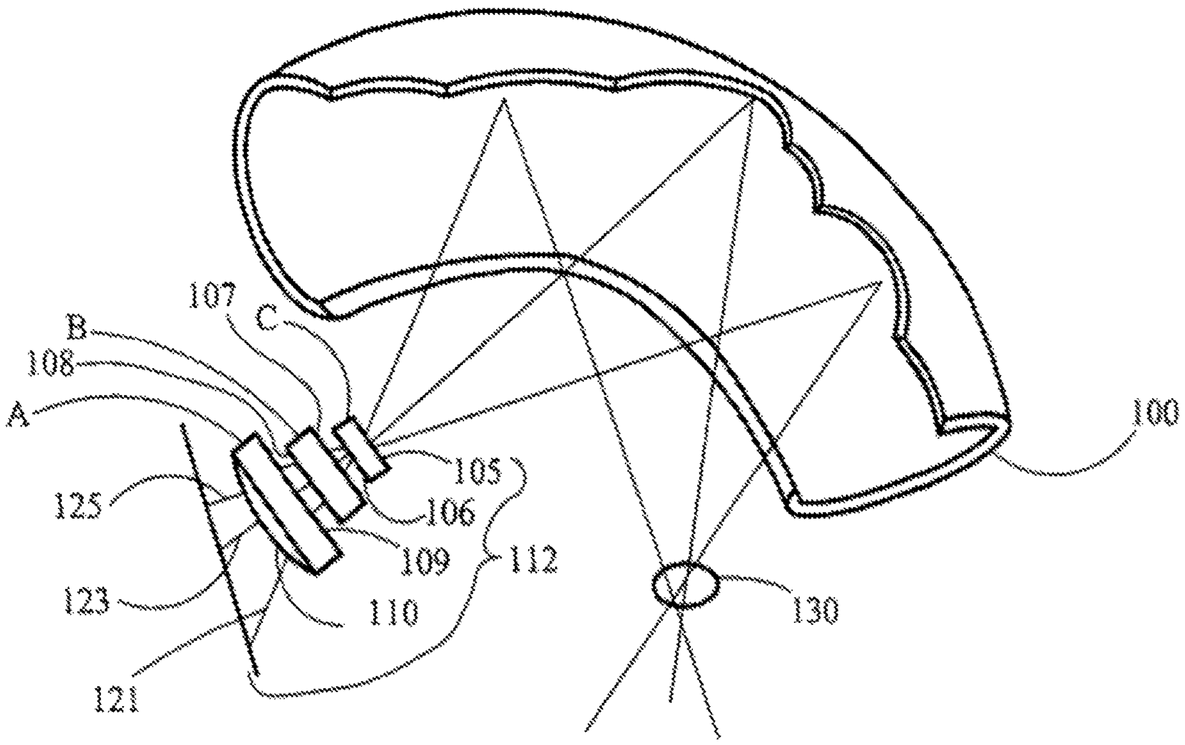
Fig. 2 PRIOR ART
FIG. 2 (reproducing FIG. 1A of Vitale et al.) is a perspective view of an ellipsoidal lens in prior art showing how a segment of an ellipsoid can function as an ocular relay. The call-out numbers in this figure are not pertinent here.

FIG. 2, from Vitale et al. (U.S. Pat. No. 7,952,059 B2) shows the best of the prior art. A bulbous, semi-transparent ellipsoidal ocular relay mirror reflects light from a bulky LED display screen and multi-element lens towards the approximate center of the wearer's eye (labeled 130 in their numbering system).

Figure 3:
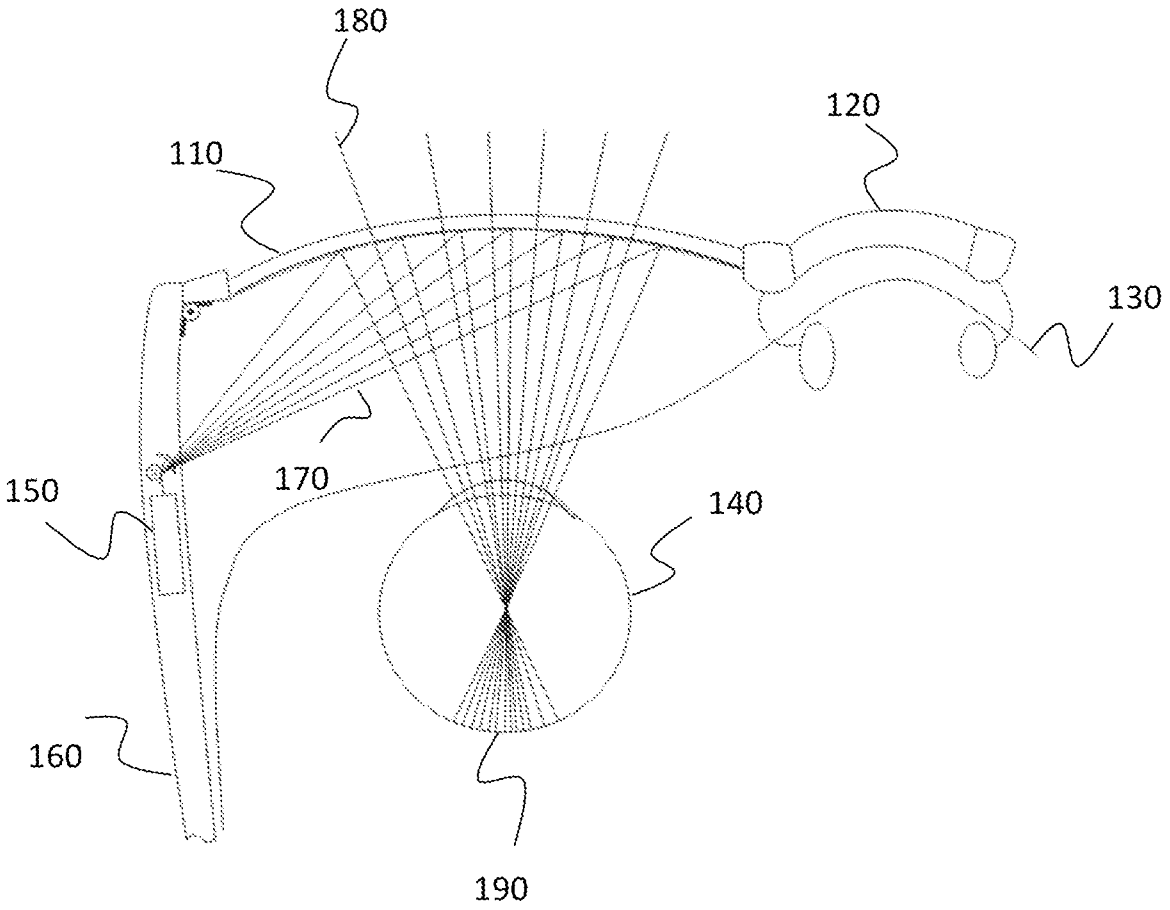
FIG. 3 shows an embodiment of HUD eyeglasses where the projector is a scanning laser and the ocular relay is a Fresnel mirror. The figure shows a horizontal cross-section of the left side of the HUD eyeglasses and their wearer. It does not show the refractive effect of the eye's cornea and lens, since their positions change with the direction of gaze.

FIG. 3 shows the preferred embodiment of the present invention, comprised of a miniaturized scanning laser system 150, located in the temple 160 of the eyeglasses, and a flat or gently curved, semi-reflective lens 110 comprised of alternating reflective and clear segments. Although the display system is shown for only one eye, in the preferred embodiment there would be a display system for each eye.

Figure 4:
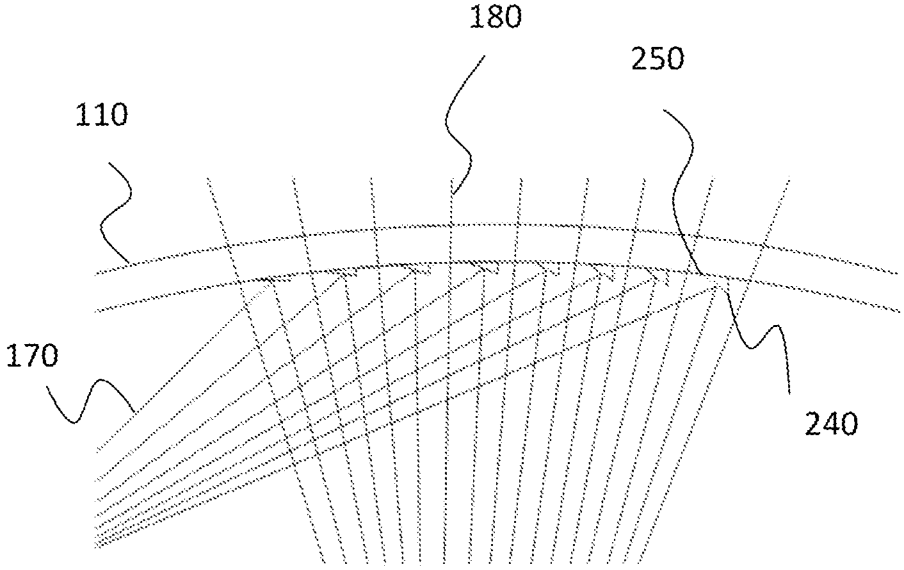
FIG. 4 is a detail of the Fresnel mirror in FIG. 3.

In this embodiment, the lens 110 is comprised—not of a single mirror—but of narrow strips of ellipsoidal mirrors, separated by clear, non-mirrored spaces (see FIG. 4). In other words, the lens 110 is a Fresnel mirror with interstices 250 between the mirrored strips 240. The mirrored strips 240 are not parts of single ellipsoid. Instead they are the intersections of a family of confocal ellipses of different radii with a thin shell determined by the shape of the eyeglass lens 110.

Figure 5:
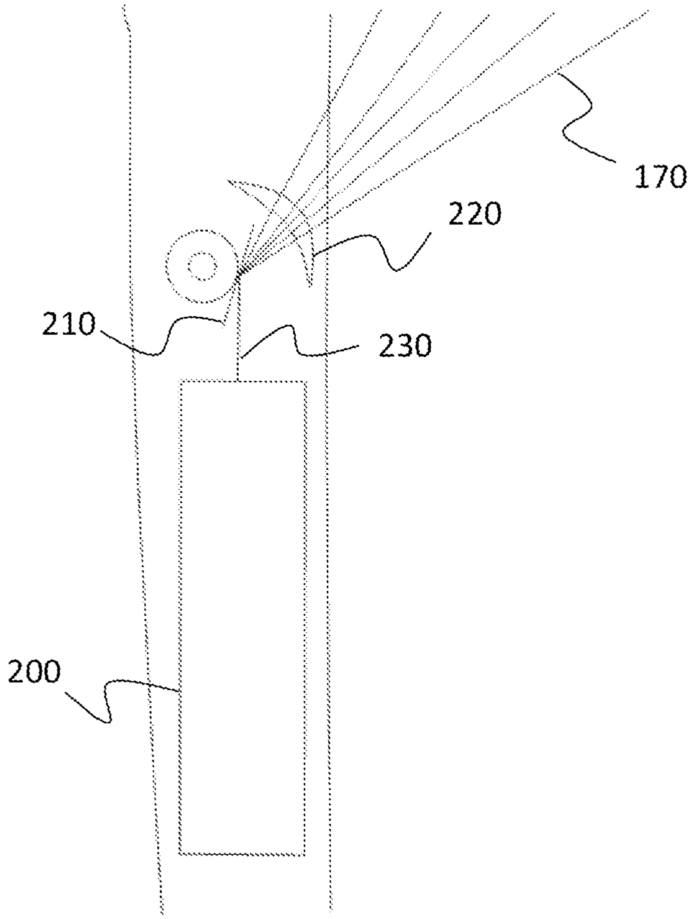
FIG. 5 a detail view of the scanning laser projector in FIG. 3.

Each ellipsoidal strip 240 has one focus at the center of the deflection mirror 210 (see FIG. 5), as imaged by the corrective lens 220, and the other at the approximate center of the wearer's eyeball 140. The strip 240 reflects the beam 170, coming from the mirror 210, towards the center of the wearer's eyeball 140. FIG. 4 does not attempt to show the refraction of light rays by the optical components of the eye itself. The eyeball 140 rotates in its socket as the direction of gaze changes, and so these optical properties depend on which way the eye is looking.

The focal point within the eye may be at the center of rotation of the eyeball or somewhat anterior to it. While looking straight ahead at a scene, the eye perceives, through peripheral vision, a field of view extending approximately 150 degrees horizontally and 120 degrees vertically. That will not be the case, however, for the HUD's digital display. Because of its very small numerical aperture, the digital display will fade to invisibility as it extends away from the center of gaze. In some situations this may be a useful feature, as it helps to make the difference between the digital display and the natural scene more obvious. In others it may be less desirable. It is possible to mitigate this low-peripheral-vision effect by moving the focal point of the ocular relay forward from the center of the eyeball. The tradeoff is that doing so will reduce the width of the field through which the digital display can be seen in focused vision.

Because the ellipsoidal strips of the eyeglass lens 110 always direct the laser light 170 towards the center of the eye, some part of the projected image will always enter the wearer's pupil, regardless of which way the eye 140 rotates in its socket. Light 180 from the scene in front of the user can pass through the gaps 250 of clear lens in between the mirrored strips 240 and also enter the viewer's pupil.

The brightness of the projected display relative to the outside world can be adjusted by varying the intensity of the laser(s). A photocell or a video camera incorporated into the eyeglass frame 120 could make this adjustment automatically.

As seen from the wearer's point of view, approximately 50% of the lens 110 would appear silvered and the rest would be transparent. Seen from the angle of the deflection mirror 210, however, the size and separation of the mirrored steps can be such that the lens appears to be 100% silvered, and none of the laser beam passes through the lens 110 to be visible to another observer. The computer-generated display is therefore completely private.

The lattice of mirrored strips 240 is too close to the wearer's eye to be in focus, and their separation should be small enough to so he or she is not aware of the lattice. On the other hand, their separation should not be so small as to produce noticeable optical diffraction effects. For example, but without restriction, a spacing of 0.5 mm (0.02 inches) might be suitable.

Although the mirrored strips 240 are shown in FIG. 4 as projecting from the inner margin of the eyeglass lens, they may also be embedded in the same transparent material (e.g. polycarbonate, CR-39 plastic, Trivex) as the lens, making them easier to keep clean.

The ellipsoidal lens strips do introduce some optical aberrations. An aspheric corrective lens (220 on FIG. 5) largely compensates for these, so the beam 230 from the laser (or lasers) 200 is brought to sharp focus on a spot in the wearer's retina 190. In this way the computer-generated raster is imaged on the surface of the retina 190.

As mentioned above, the Fresnel mirror distorts the image by its non-uniform magnification. This distortion is corrected by digitally pre-processing the signals to the projectors, introducing opposite and canceling distortions.

Light 180 from objects in front of the user also forms an image on the retina 190. As a result, the digital display is superimposed on the view of the external world. Because the digital display has great depth-of-field (small exit pupil), it and the external scene appear in focus at the same time, regardless of the distance to the scene.

Since the projected display depends only on the mirrored strips on the inside surface of the lens 110 (and has near-infinite depth of field), the outside surface can be uniform or vary in thickness. The HUD eyeglasses are therefore compatible with prescription lenses.

The scanning laser system 150 is comprised (FIG. 5) of a miniature laser 200, a movable deflection mirror 210 and an aspheric correction lens 220 which reduces optical aberrations in the HUD system. In a color display, 200 may actually be three optically coaxial lasers of different wavelengths. The deflection mirror 210 rotates or vibrates around both vertical and horizontal axes and deflects the laser beam 230 as its intensity is modulated, so as to generate a raster display 170.

A conventional eyeglass frame 120 and temple 160 hold the conventionally shaped eyeglass lens 110 in place on the viewer's face 130.

In a different embodiment, there are no spaces between the mirrored strips, but the mirrors are semi-transparent so that some light from the external scene can reach the eye.

In another embodiment, the Fresnel mirror on the lens 110 is replaced by a HOE. In general, a HOE can mimic any simple optical element but in this case it would be formed by the interference pattern of two coherent beams diverging from the two conjugate focal points, corresponding to the exit pupil of the projector and the center of the eye. In this way, the HOE is an analogue of an ellipsoid or, more properly, of a thin Fresnel mirror having the same overall shape and foci.

The HOE is partly transparent so that some light from the external scene can reach the eye. Light 180 from objects in front of the user also forms an image on the retina 190. As a result, the digital display is superimposed on the view of the external world. Because the digital display has great depth-of-field (small exit pupil), it and the external scene appear in focus at the same time, regardless of the distance to the scene.

In yet another embodiment, the HOE on the lens 110 is replaced by a diffraction mirror having two conjugate foci, such that light from one focus is diffracted by the diffraction pattern to converge on the other focal point, and the diffraction mirror is positioned such that one focus lies at the exit pupil of the image projector, and its other focus is located at or slightly anterior to the center of the eyeball.

The diffraction mirror is partly transparent so that some light from the external scene can reach the eye. Light 180 from objects in front of the user also forms an image on the retina 190. As a result, the digital display is superimposed on the view of the external world. Because the digital display has great depth-of-field (small exit pupil), it and the external scene appear in focus at the same time, regardless of the distance to the scene.

Figure 6:
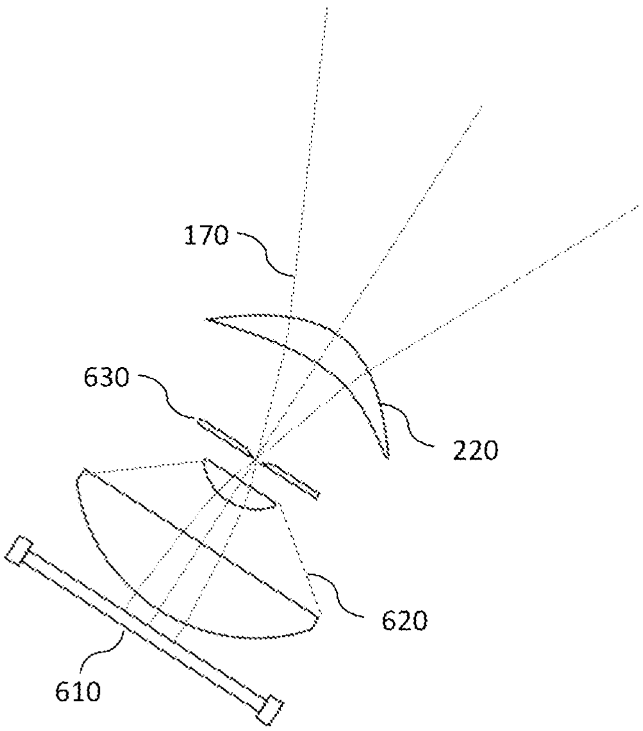
FIG. 6 shows a detail where the projector comprises a LED display screen, a condenser lens, a pinhole and a corrective lens.

In yet another embodiment, the scanning laser system is replaced by a projector (see FIG. 6) comprised of:

- a display screen 610 using LED or equivalent technology,
- a condenser 620 consisting of one or more lenses,
- a diaphragm with a pinhole 630 at the focus of said condenser, and
- an aspheric correction lens 220.

This embodiment presents two disadvantages compared to a scanning laser, namely the bulk of the condenser and the limited brightness available from a LED panel compared to a laser.

In another embodiment (see FIG. 7) of the present invention, the beam 170 of the miniaturized laser scanning system 150 arises in front of the eyeglasses 130 and is directed backward towards the lens 110, where a HOE redirects the beam to converge at or slightly anterior to the center of the eye 140.

In this case the two foci of the HOE are located on opposite sides of the lens 110, at the exit pupil of the projector and at or slightly anterior to the center of the eye.

The HOE is partly transparent so that some light from the external scene can reach the eye. Light 180 from objects in front of the user also forms an image on the retina 190. As a result, the digital display is superimposed on the view of the external world. Because the digital display has great depth-of-field (small exit pupil), it and the external scene appear in focus at the same time, regardless of the distance to the scene.

In this embodiment, too, the HUD eyeglasses are compatible with prescription lenses.

A conventional eyeglass frame 120 and extended temple 160 hold the scanning laser 150 and the conventionally shaped eyeglass lens 110 in place on the viewer's face 130.

Figure 7:
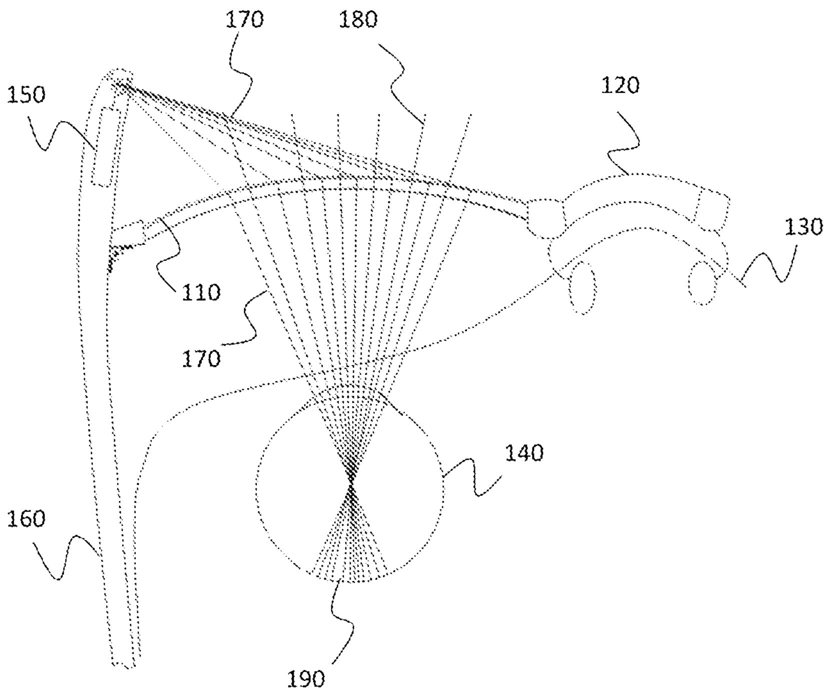
FIG. 7 shows an embodiment of the HUD eyeglasses comprising a scanning laser system and a HOE whose focal points are on opposite sides of lens. The figure shows a horizontal cross-section of the left side of the HUD eyeglasses and their wearer. It does not show the refractive effect of the eye's cornea and lens, since their positions change with the direction of gaze.

In a different embodiment similar to FIG. 7, the ocular relay is a Fresnel mirror, replacing the HOE. The two foci of the Fresnel mirror are located on opposite sides of the lens 110, at the exit pupil of the projector and at or slightly anterior to the center of the eye.

The Fresnel mirrored strips are separated by gaps, or are semi-transparent, allowing Light 180 from the external scene to form an image on the retina 190. As a result, the digital display is superimposed on the view of the external world. Because the digital display has great depth-of-field (small exit pupil), it and the external scene appear in focus at the same time, regardless of the distance to the scene.

In this embodiment, too, the HUD eyeglasses are compatible with prescription lenses.

In yet another embodiment similar to FIG. 7, the ocular relay is a Fresnel lens, replacing the Fresnel mirror. The two foci of the Fresnel lens are located on opposite sides of the lens 110, at the exit pupil of the projector and at or slightly anterior to the center of the eye.

The Fresnel lens is comprised of prismatic ridges on one or the other the surface of the lens 110, separated by flat regions that allow light from the external scene to pass through and reach the eye. As a result, the computer-generated display is superimposed on the view of the external world. Because the digital display has great depth-of-field (small exit pupil), it and the external scene appear in focus at the same time, regardless of the distance to the scene.

In this embodiment, too, the HUD eyeglasses are compatible with prescription lenses.

In yet another embodiment similar to FIG. 7, the ocular relay is a diffraction lens. The two conjugate foci of the diffraction lens are located on opposite sides of the lens 110, at the exit pupil of the projector and at or slightly anterior to the center of the eye.

The diffraction lens is partly transparent, allowing light from the external scene to pass through and reach the eye. As a result, the computer-generated display is superimposed on the view of the external world. Because the digital display has great depth-of-field (small exit pupil), it and the external scene appear in focus at the same time, regardless of the distance to the scene.

In this embodiment, too, the HUD eyeglasses are compatible with prescription lenses.

In any of the previous embodiments, the beam of the projection system for one or both eyes may be redirected at the wearer's discretion to project on a nearby wall or screen, so that the wearer can share an image with someone else.

In any of the previous embodiments, rotations of the wearer's head may be cancelled by digitally translating or rotating the digital display image in the opposite sense, such that the digital display appears to remain fixed while the wearer's head moves. The input for this digital preprocessing comes from accelerometers or gyros within the HUD eyeglass system.

REFERENCES CITED

| | | | |
|---|---|---|---|
| 61/742,623 | August 2012 | Stephenson | (provisional) |
| 7,952,059 B2 | May 2011 | Vitale et al. | 250/208.1 |
| 7,656,585 B1 | February 2010 | Powell et al. | 359/630 |
| 2002/0030637 A1 | March 2002 | Mann | 345/8 |

The invention claimed is:

1. A wide-field HUD eyeglass system, for one eye or for each of both eyes, wherein said HUD system is comprised of, for each eye:

an eyeglass frame of conventional appearance, including temple-piece and eyeglass lens, which may or may not be corrective;

a miniaturized digital display system, capable of projecting video, text or images, with a sub-millimeter-sized exit pupil, necessary to reduce aberrations and allow depth-of-field from a foot to infinity;

said sub-millimeter-sized exit pupil located in or adjoined to said temple-piece of said eyeglass frame; and an ocular relay system, attached to or incorporated into said eyeglass lens that allows light from the external scene to pass through to the eye and also has two conjugate optical foci, focus 1 at the said sub-millimeter-sized exit pupil of said digital display system and focus 2 located approximately at the center of the viewer's eyeball, such that when light from said digital display system is directed from focus 1 in any direction, it is redirected and arrives in the eye at focus 2 from a corresponding direction, thereby able to cover much of a typical eye's 150°×120° field of view.

2. The wide-field HUD eyeglass system as in claim 1 wherein said digital display system comprises a laser system whose intensity may be modulated, with said sub-millimeter-sized exit pupil, a deflection mirror capable of producing a raster-scanned image, and an aspheric lens for correcting aberrations and distortions introduced by the ocular relay system.

3. The wide-field HUD eyeglass system as in claim 2 wherein said laser system includes multiple, optically co-axial lasers of different wavelengths, such as red, green and blue, where the intensity of each of said lasers can be independently modulated.

4. The wide-field HUD eyeglass system as in claim 1 wherein said digital display system is comprised of:

a display screen using LED, AMOLED, OLED or equivalent technology;

a condenser consisting of one or more lenses; and at the focus of said condenser, a sub-millimeter-sized pinhole, constituting said sub-millimeter-sized exit pupil.

5. The wide-field HUD eyeglass system as in claim 1, wherein said sub-millimeter-sized exit pupil of said digital display system is on the same side of the eyeglass as the eye.

6. The wide-field HUD eyeglass system as in claim 1, wherein said sub-millimeter-sized exit pupil of said digital display system is on the front side of said eyeglass frame, for example but without restriction contained within an extension of said temple-piece of said eyeglass frame, directing its light inwards towards said eyeglass lens and thence to the wearer's eye.

7. The wide-field HUD eyeglass system as in claim 1, wherein said ocular relay system is a Fresnel mirror such that:

it consists of a plurality of concentric, narrow, roughly oval mirrored strips;

the mirrored strips may be ridges on the surface of a transparent substrate, or may be embedded within it;

said transparent substrate is flat or slightly concave toward the eye and is attached to or identical with said eyeglass lens;

the Fresnel mirror is so designed that it has two conjugate foci, one at said sub-millimeter-sized exit pupil of said digital display system and the other near the center of the viewer's eyeball;

the curved surfaces of the mirrored strips conform to the intersection between an imaginary thin shell at the margin of said transparent substrate and a family of ellipsoids or ellipsoid-like shapes with the same conjugate foci but different radii;

narrow gaps between the strips allow some light from the external scene to pass through to the wearer's eye;

and viewed from said sub-millimeter-sized exit pupil of said digital display system, the mirrored strips overlap completely so that light from the digital display system is visible only to the wearer of the HUD glasses.

8. The wide-field HUD eyeglass system as in claim 7, wherein the mirrors are embedded in said transparent substrate without any gaps between them but are only partly silvered, so that some light can penetrate from the external scene to the wearer's eye.

9. The wide-field HUD eyeglass system as in claim 1, wherein said ocular relay system:

is a holographic optical element (HOE) having two conjugate foci, such that light from one focus is diffracted by the HOE to converge on the other focal point;

the HOE is flat or slightly concave towards the eye, and is attached to or incorporated into said eyeglass lens;

one focus of the HOE is at the exit pupil of said digital display system, and the other near the center of the viewer's eyeball;

the HOE has been created with the same wavelengths used in said digital display system, generating a plurality of overlapping sets of diffraction patterns in the emulsion, and so producing the same two conjugate foci for each wavelength used;

and the HOE is partly transparent so that light from the external scene can also pass through it to the eye.

10. The wide-field HUD eyeglass system as in claim 1, wherein:

said ocular relay system is a diffraction lens or mirror having two conjugate foci, such that light from one focus is scattered by the diffraction pattern to converge at the other focus;

the diffraction lens or mirror is positioned such that one focus lies at said sub-millimeter-sized exit pupil of said digital display system, and the other at the approximate center of the viewer's eyeball;

the diffraction lens or mirror itself may be flat or slightly concave toward the eye, and is attached to or incorporated into said eyeglass lens;

and the diffraction lens or mirror is partly transparent so that light from the external scene can pass through it to the eye.

11. The wide-field HUD eyeglass system as in claim 1, wherein intrinsic image distortions due to non-uniform magnification in the ocular relay system are corrected by digitally pre-processing the signals to the digital display system, introducing opposite and canceling distortions.

12. The wide-field HUD eyeglass system as in claim 1, wherein the image sent to the digital display systems is digitally translated and rotated in response to movements of the wearer's head, such that the digital display seen by the wearer appears to remain fixed relative to the scene when the wearer's head moves, said translations and rotations being detected by sensors such as accelerometers, magnetometers or gyros within said wide-field HUD eyeglass system.

13. The wide-field HUD eyeglass system as in claim 6, wherein said ocular relay system is a Fresnel lens such that:

it consists of a plurality of concentric, narrow, roughly oval prismatic strips;

the prismatic strips may be ridges on the outer surface of a transparent substrate, or may be embedded within a substrate of different refractive index;

the transparent substrate is flat or slightly concave toward the eye, and is attached to or incorporated into said eyeglass lens;

the Fresnel lens has its conjugate foci on opposite sides of said eyeglass lens, so that light from the focus co-located with said sub-millimeter-sized exit pupil of said digital display system is refracted by said prismatic strips and converges at the other focus, near the center of the eyeball;

the curved surfaces of said prismatic strips conform to the intersection between an imaginary thin shell at the margin of the substrate and a family of meniscus lens segments with the same conjugate foci but different diameters; and narrow gaps between the strips allow some light from the external scene to pass straight through without refraction to the wearer's eye.

14. The wide-field HUD eyeglass system as in claim 1 wherein said laser or lasers are located in a separate package located remotely on the wearer's person, connected to the remainder of the digital display system by an optical fiber.

15. The wide-field HUD eyeglass system as in claim 1 wherein the intensity of said digital display system is adjusted according to the brightness of the scene by a photocell or camera mounted in said eyeglass frame.

* * * * *